Dec. 25, 1956  G. G. INGHAM  2,775,173
DUPLEX FILM RACK SUPPORT AND DRIP TRAY
Filed June 2, 1954
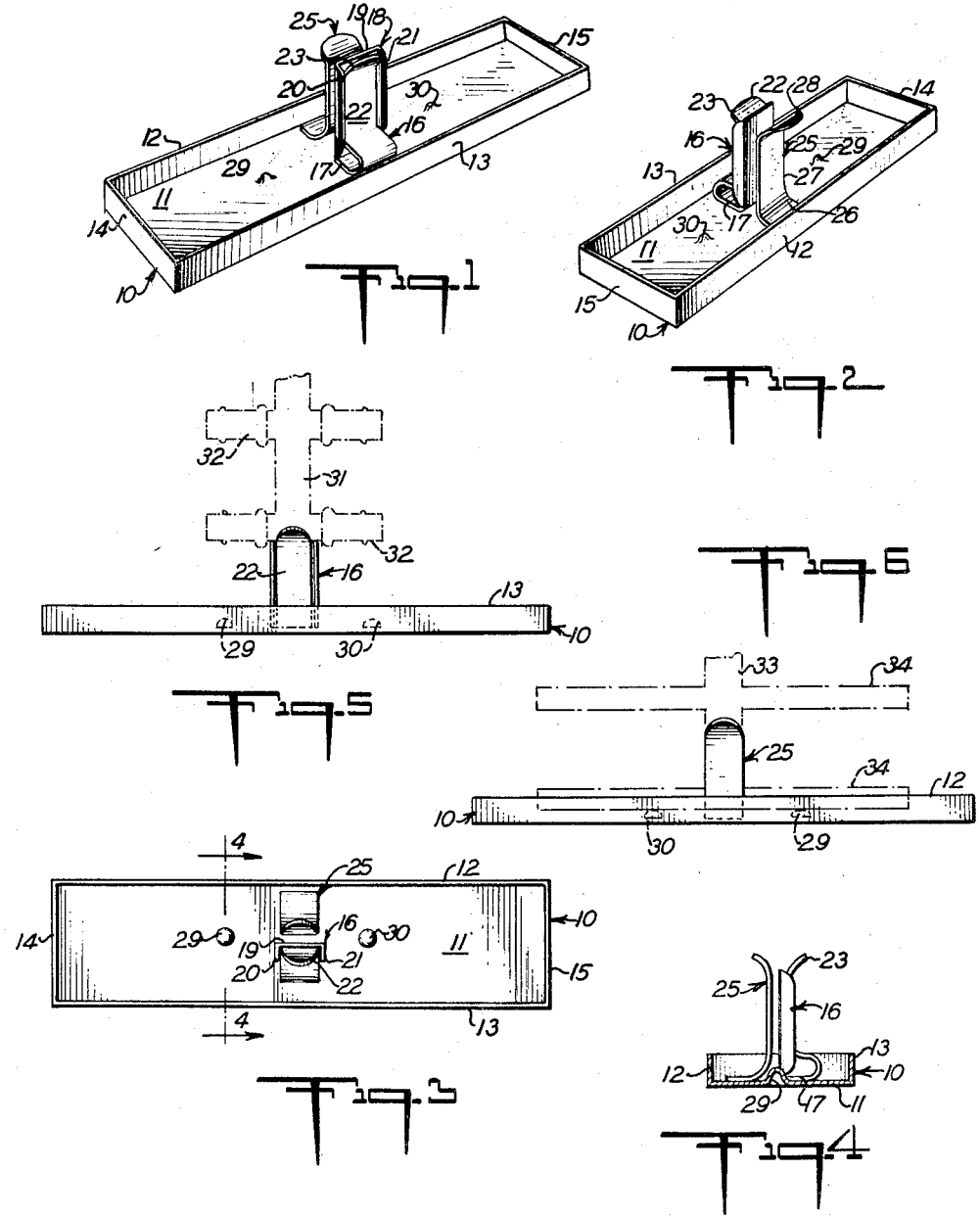
INVENTOR.
GEORGE G. INGHAM
ATTORNEYS ยูไนเต็ด สเตตส์ Patent Office 2,775,173
Patented Dec. 25, 1956

2,775,173

DUPLEX FILM RACK SUPPORT AND DRIP TRAY

George G. Ingham, Amarillo, Tex.

Application June 2, 1954, Serial No. 433,904

8 Claims. (Cl. 95—100)

This invention relates to photography and more particularly to a drip tray provided with means for detachably receiving and firmly supporting in upright position either simultaneously or separately at least two types of film racks primarily intended for receiving and supporting X-ray film or the like and in which such films are conveniently displayed and in which the tray serves to receive any drippage from such films.

Heretofore, numerous types of film racks have been employed to support X-ray films and the like during development thereof, and also for displaying such films and in some instances drip trays have been provided for catching any drippage from such films. However, these prior art devices did not provide a suitable support for the film rack, and in most instances the rack was designed to be suspended with the drip tray suspended beneath such rack.

Since it is often highly desirable and at some times extremely necessary to inspect X-ray films at the earliest possible moment after development, and since such films are, of course, still wet and subject to drippage, some means for supporting such films and preventing drippage on surrounding surfaces or objects represents a highly desirable piece of equipment, and if such drip-catching means further provides a firm support for the film rack the usefulness thereof is materially increased. Furthermore, since at least two types of film racks are available it is highly desirable that the drip tray and film rack support of this invention accommodate either type of film rack and provide a firm support for the same without in any way obscuring the films carried thereby.

It is accordingly an object of the invention to provide a duplex film rack supporting means and drip tray which may be economically manufactured from readily available material and which will provide a firm support for the film rack to hold the same in an upright position in which the films carried thereby are clearly visible.

A further object of the invention is the provision of a duplex film rack support and drip tray including means for detachably and firmly receiving at least two types of film racks and for supporting the same in an upright position without danger of tilting in any direction.

A still further object of the invention is the provision of a duplex film rack support and drip tray which may be conveniently manufactured from only three parts, thus materially contributing to simplicity of design and economical manufacture.

Another object of the invention is the provision of a duplex film rack supporting means and drip tray which will operate to firmly support either simultaneously or separately at least two types of film racks in upright position, and which will not in any way obscure the films carried by such racks.

A further object of the invention is the provision of a duplex film rack support and drip tray incorporating means for detachably engaging either simultaneously or separately at least two types of film racks to firmly support the same, but at the same time permitting convenient removal thereof from the drip tray.

Further objects and advantages of the invention will be apparent from the following description taken in conjunction with the accompanying drawing, wherein:

Fig. 1 is a view in perspective showing the duplex film rack support and drip tray of this invention;

Fig. 2, a view in perspective similar to Fig. 1 and showing the duplex film rack support and drip tray of this invention from the opposite side thereof;

Fig. 3, a top plan view of the film rack support and drip tray shown in Fig. 1;

Fig. 4, a sectional view on the line 4—4 of Fig. 3;

Fig. 5, a front elevational view of the duplex film rack support and drip tray of this invention in operation and showing one type of film rack in dotted lines and in operative position thereon; and Fig. 6, a view similar to Fig. 5 but showing in dotted lines another type of film rack supported by the drip tray and film rack support of this invention.

With continued reference to the drawing there is shown a drip tray 10 which may comprise a bottom wall 11, side walls 12 and 13, and end walls 14 and 15. The tray 10 may be formed by bending from a sheet of suitable material such as stainless steel or other suitable metal, or may be drawn from a sheet of such material, or if desired may be molded from suitable plastic or the like. The tray 10 must, of course, be liquid-tight and in the event the same is formed by folding or bending a sheet of material the corners would of necessity be soldered, welded, or otherwise made liquid-tight.

Disposed substantially centrally of the tray 10 but to one side of the longitudinal center line thereof, is a spring clip 16, the base of which 17 may be secured to the bottom wall 11 of the tray 10 by welding or by any other suitable means. The clip 16 may comprise an upwardly extending channel-shaped socket member 18 provided with a rear wall 19 and forwardly extending side walls 20 and 21. Extending upwardly from the base 17 and preferably integral therewith and with the socket member 18 is a resilient arm 22 which, as shown in Figs. 1 and 3, is disposed within the confines of the side walls 20 and 21 of the socket member 18. The upper end of the arm 22 terminates in a diverging portion 23 which facilitates insertion of a film rack in the clip member in a manner to be presently described. While the resilient arm 22 has been described as integral with the base 17 and socket member 18, obviously these parts may be made separate is desirable.

Also disposed substantially centrally of the tray 10 and in alignment with the spring clip 16, but on the opposite side of the longitudinal center line of the tray 10, is a spring finger 25 which may include an out-turned base portion 26 secured to the bottom wall 11 of the tray 10 by any suitable means such as spot-welding or the like, the spring finger 25 also including an upwardly extending portion 27 spaced from the rear wall 19 of the spring clip 16 but substantially parallel thereto, the portion 27 terminating in an outwardly diverging portion 28 at the upper end thereof. The spring finger 25 in cooperation with the rear wall 19 of the spring clip 16 serves to support a film rack in a manner to be presently described.

The bottom wall 11 of the tray 10 may be provided with dimples or protuberances 29 and 30 extending upwardly from the bottom wall 11 and disposed on each side of the spring clip 16 and spring finger 25 along the longitudinal center line of the tray 10. The purpose and operation of these protuberances or dimples will be presently described. The dimples or protuberances 29 and 30 may be formed by upsetting the material of the bottom wall 11, or if desired may be provided by members welded thereto or secured in any other desired way. However, for economy in manufacture it is preferred that the dimples 29 and 30 be formed from the material of the bottom wall 11.

The duplex film rack support and drip tray of this invention is intended to detachably receive and firmly support at least two types of film racks and, as shown in Fig. 5, one type of film rack may well comprise a central, longitudinal, elongated member 31 which may have affixed or integral therewith a plurality of cross-arms 32, each of which is intended to support an X-ray or other film during developing and drying thereof. In utilizing the present invention the lower end of the longitudinal, central member 31 of the film rack is inserted in the channel-shaped socket member 18 between the spring arm 22 and the rear wall 19 of the socket member 18 and, as shown in Fig. 5, the lower film supporting cross-arm 32 will engage the upper edge of the socket member 18 and prevent further downward movement of the film holder. This serves to securely support the film holder in upright position with the side walls 20 and 21 of the socket member 18 preventing tilting of the film holder, and with the upper edge of the socket member 18 preventing movement of the film holder below a point where the lower-most film supported thereon will be clearly visible above the side walls 12 and 13 of the drip tray 10.

The duplex film rack support and drip tray of this invention is also designed to support another type of film rack which, as shown in Fig. 6, may well comprise a central portion 33 provided with laterally extending arms 34 for receiving X-ray or other films therebetween. The particular film rack 33 shown in Fig. 6 forms no part of this invention and consequently any detailed description thereof is considered unnecessary.

As shown in Fig. 6 the central portion 33 of the second type of film rack is frictionally engaged between the rear wall 19 of the spring clip member 16 and the upwardly extending spring finger 25. The lower-most cross-arm 34 on the film rack engages the upwardly projecting dimples or protuberances 29 and 30 which serve to provide a relatively wide spaced bearing area and also to elevate the lower arm 34 above the bottom 11 of the tray 10 and to insure that film disposed between the arms 24 will be entirely above the side walls 12 and 13 of the tray 10, thus avoiding any instruction and permitting a convenient view of the entire film carried by the rack 33.

As will be seen from an inspection of Fig. 6 the entire weight of the film rack 33 will be carried by the dimples or protuberances 29 and 30 and the resilient finger 25 will firmly grip the central portion 33 of the film rack to firmly hold the same in place within the tray 10. However, the rack 33 may be conveniently removed simply by exerting a slight upward pressure thereon, which will serve to disengage the same from the resilient finger 25 and rear wall 19 of the spring clip 16.

It will be seen that by the above described invention there has been provided a film rack support and drip tray which will operate to either simultaneously receive and support two different types of film racks or, of course, will support either of these types of film racks separately. The racks are firmly but detachably secured in place and are supported against tilting in any direction, and yet may be conveniently removed from the tray at will. Furthermore, the drip tray of this invention prevents drippage of water or chemicals from the film carried by the film rack and permits convenient and immediate inspection of such films after development thereof. Since the film rack support and drip tray of this invention may be manufactured from only three parts, it will be seen that economical construction is possible and consequently the same may be manufactured and sold in a highly competitive market. The simplicity of the invention also contributes materially to ease of cleaning and the maintenance of sanitary conditions.

It will be obvious to those skilled in the art that various changes may be made in the invention without departing from the spirit and scope thereof, and therefore the invention is not limited by that which is shown in the drawing and described in the specification, but only as indicated in the appended claims.

What is claimed is:

1. A duplex film rack support and drip tray comprising a tray having bottom, side and end walls, a resilient one-piece clip secured to said bottom wall to one side of the longitudinal center line and substantially centrally thereof and including an upwardly extending socket member of channel cross-section and an upstanding resilient arm disposed within said socket member in substantially parallel relation thereto and terminating at its upper end in a diverging portion, a resilient finger secured to said bottom wall on the opposite side of said center line in substantial alignment with said socket member and in spaced substantially parallel relation thereto, said resilient finger terminating at its upper end in an outwardly diverging portion and upwardly extending protuberances in said bottom wall disposed on opposite sides of said clip substantially on said center line whereby the central member of a film rack having film supporting cross bars may be detachably received in said socket member and retained therein by said resilient arm, the walls of said socket preventing tilting of said film rack and the upper edge of said socket engaging the lower cross bar of said film rack to support film carried thereby above the side walls of said tray and whereby a second film rack may be detachably received between said finger and said socket member and in engagement with said protuberances to firmly support said second rack on said tray and with the lower-most films in said second rack clearly visible above said side walls.

2. A duplex film rack support and drip tray comprising a tray having bottom, side and end walls, a resilient one-piece clip secured to said bottom wall to one side of the longitudinal center line and substantially centrally thereof and including an upwardly extending socket member of channel cross-section and an upstanding resilient arm disposed within said socket member in substantially parallel relation thereto, a resilient finger secured to said bottom wall on the opposite side of said center line in substantial alignment with said socket member and in spaced substantially parallel relation thereto, and upwardly extending protuberances in said bottom wall disposed on opposite sides of said clip substantially on said center line whereby the central member of a film rack having film supporting cross bars may be detachably received in said socket member and retained therein by said resilient arm, the walls of said socket preventing tilting of said film rack and the upper edge of said socket engaging the lower cross bar of said film rack to support film carried thereby above the side walls of said tray and whereby a second film rack may be detachably received between said finger and said socket member and in engagement with said protuberances to firmly support said second rack on said tray and with the lower-most films in said second rack clearly visible above said side walls.

3. A duplex film rack support and drip tray comprising a tray having bottom, side and end walls, a resilient clip secured to said bottom wall to one side of the longitudinal center line and substantially centrally thereof and including an upwardly extending socket member of channel cross-section and an upstanding resilient arm disposed within said socket member in substantially parallel relation thereto, a resilient finger secured to said bottom wall on the opposite side of said center line in substantial alignment with said socket member and in spaced substantially parallel relation thereto and upwardly extending protuberances in said bottom wall disposed on opposite sides of said clip substantially on said center line whereby the central member of a film rack having film supporting cross bars may be detachably received in said socket member and retained therein by said resilient arm, the walls of said socket preventing tilting of said film rack and the upper edge of said socket engaging the lower cross bar of said film rack to support film carried thereby above the side walls of said tray and whereby a second film rack may be detachably received between said finger and said socket member and in engagement with said protuberances to firmly support said second rack on said tray and with the lower-most films in said second rack clearly visible above said side walls.

4. A duplex film rack support and drip tray comprising a tray having bottom, side and end walls, a resilient clip secured to said bottom wall to one side of the longitudinal center line and substantially centrally thereof and including an upwardly extending socket member of channel cross-section and an upstanding resilient arm disposed within said socket member, a resilient finger secured to said bottom wall on the opposite side of said center line in substantial alignment with said socket member and in spaced relation thereto and upwardly extending protuberances in said bottom wall disposed on opposite sides of said clip substantially on said center line whereby the central member of a film rack having film supporting cross bars may be detachably received in said socket member and retained therein by said resilient arm, the walls of said socket preventing tilting of said film rack and the upper edge of said socket engaging the lower cross bar of said film rack to support film carried thereby above the side walls of said tray and whereby a second film rack may be detachably received between said finger and said socket member and in engagement with said protuberances to firmly support said second rack on said tray and with the lower-most films in said second rack clearly visible above said side walls.

5. A duplex film rack support and drip tray comprising a tray having bottom, side and end walls, a resilient clip secured to said bottom wall to one side of the longitudinal center line and including an upwardly extending socket member of channel cross-section and an upstanding resilient arm disposed within said socket member, a resilient finger secured to said bottom wall on the opposite side of said center line in substantial alignment with said socket member and in spaced relation thereto and upwardly extending protuberances in said bottom wall disposed on opposite sides of said clip substantially on said center line whereby the central member of a film rack having film supporting cross bars may be detachably received in said socket member and retained therein by said resilient arm, the walls of said socket preventing tilting of said film rack and the upper edge of said socket engaging the lower cross bar of said film rack to support film carried thereby above the side walls of said tray and whereby a second film rack may be detachably received between said finger and said socket member and in engagement with said protuberances to firmly support said second rack on said tray and with the lower-most films in said second rack clearly visible above said side walls.

6. A duplex film rack support and drip tray comprising a tray having bottom, side and end walls, a resilient clip secured to said bottom wall and including an upwardly extending socket member of channel cross-section and an upstanding resilient arm disposed within said socket member, a resilient finger secured to said bottom wall in substantial alignment with said socket member and in spaced relation thereto and upwardly extending protuberances in said bottom wall disposed on opposite sides of said clip in alignment therewith whereby the central member of a film rack having film supporting cross bars may be detachably received in said socket member and retained therein by said resilient arm, the walls of said socket preventing tilting of said film rack and the upper edge of said socket engaging the lower cross bar of said film rack to support film carried thereby above the side walls of said tray and whereby a second film rack may be detachably received between said finger and said socket member and in engagement with said protuberances to firmly support said second rack on said tray and with the lower-most films in said second rack clearly visible above said side walls.

7. A duplex film rack support and drip tray comprising a tray having bottom, side and end walls, a resilient clip secured to said bottom wall and including an upwardly extending socket member of channel cross-section and an upstanding opposed resilient arm, a resilient finger secured to said bottom wall in substantial alignment with said socket member and in spaced relation thereto and upwardly extending protuberances in said bottom wall disposed on opposite sides of said clip in alignment therewith whereby the central member of a film rack having film supporting cross bars may be detachably received in said socket member and retained therein by said resilient arm, the walls of said socket preventing tilting of said film rack and the upper edge of said socket engaging the lower cross bar of said film rack to support film carried thereby above the side walls of said tray and whereby a second film rack may be detachably received between said finger and said socket member and in engagement with said protuberances to firmly support said second rack on said tray and with the lower-most films in said second rack clearly visible above said side walls.

8. A duplex film rack support and drip tray comprising a tray having bottom, side and end walls, a resilient clip secured to said bottom wall and including an upwardly extending socket member of channel cross-section and an upstanding opposed resilient arm, a resilient finger secured to said bottom wall in substantial alignment with said socket member and upwardly extending protuberances in said bottom wall disposed on opposite sides of said clip in alignment therewith whereby the central member of a film rack having film supporting cross bars may be detachably received in said socket member and retained therein by said resilient arm, the walls of said socket preventing tilting of said film rack and the upper edge of said socket engaging the lower cross bar of said film rack to support film carried thereby above the side walls of said tray and whereby a second film rack may be detachably received between said finger and said socket member and in engagement with said protuberances to firmly support said second rack on said tray and with the lowermost films in said second rack clearly visible above said side walls.

References Cited in the file of this patent

UNITED STATES PATENTS

| | | |
|---|---|---|
| 1,309,705 | Suck | July 15, 1919 |
| 1,422,676 | Czarnecki | July 11, 1922 |
| 1,702,472 | Fricker | Feb. 19, 1929 |
| 2,288,325 | Rodier | June 30, 1942 |
| 2,665,103 | Flora et al. | Jan. 5, 1954 |
| 2,668,486 | Barker | Feb. 9, 1954 |
| 2,689,997 | Lodwig | Sept. 28, 1954 |